Aug. 11, 1959  J. Z. DE LOREAN  2,898,750
UNIVERSAL JOINT
Filed Sept. 24, 1958  2 Sheets-Sheet 1
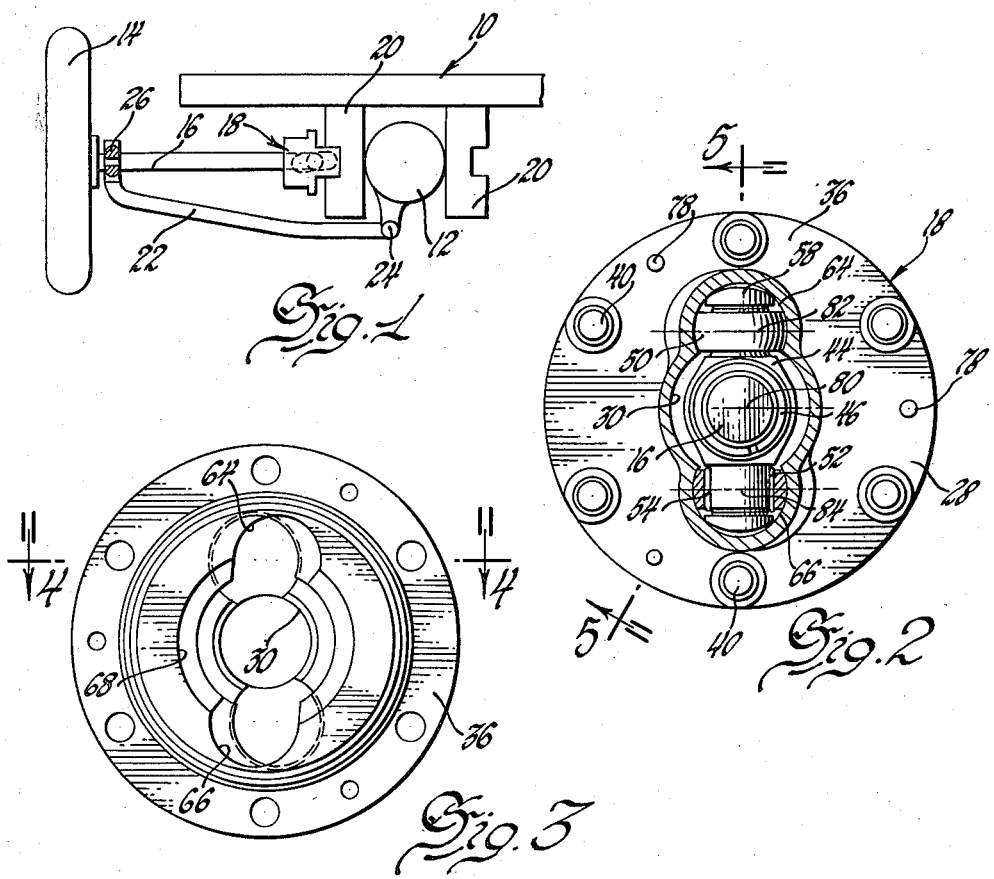
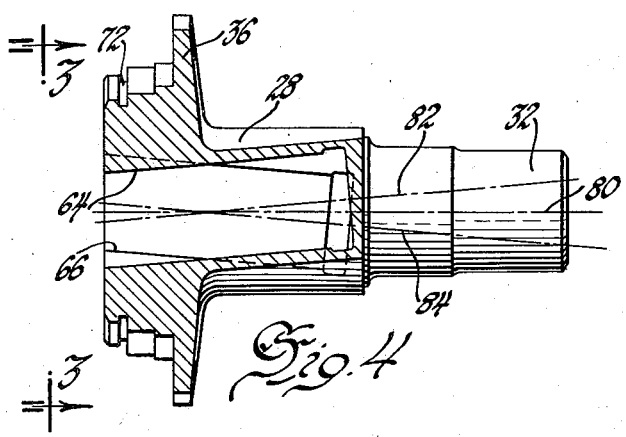
INVENTOR.
John Z. DeLorean
BY
L.W. Burch
ATTORNEY

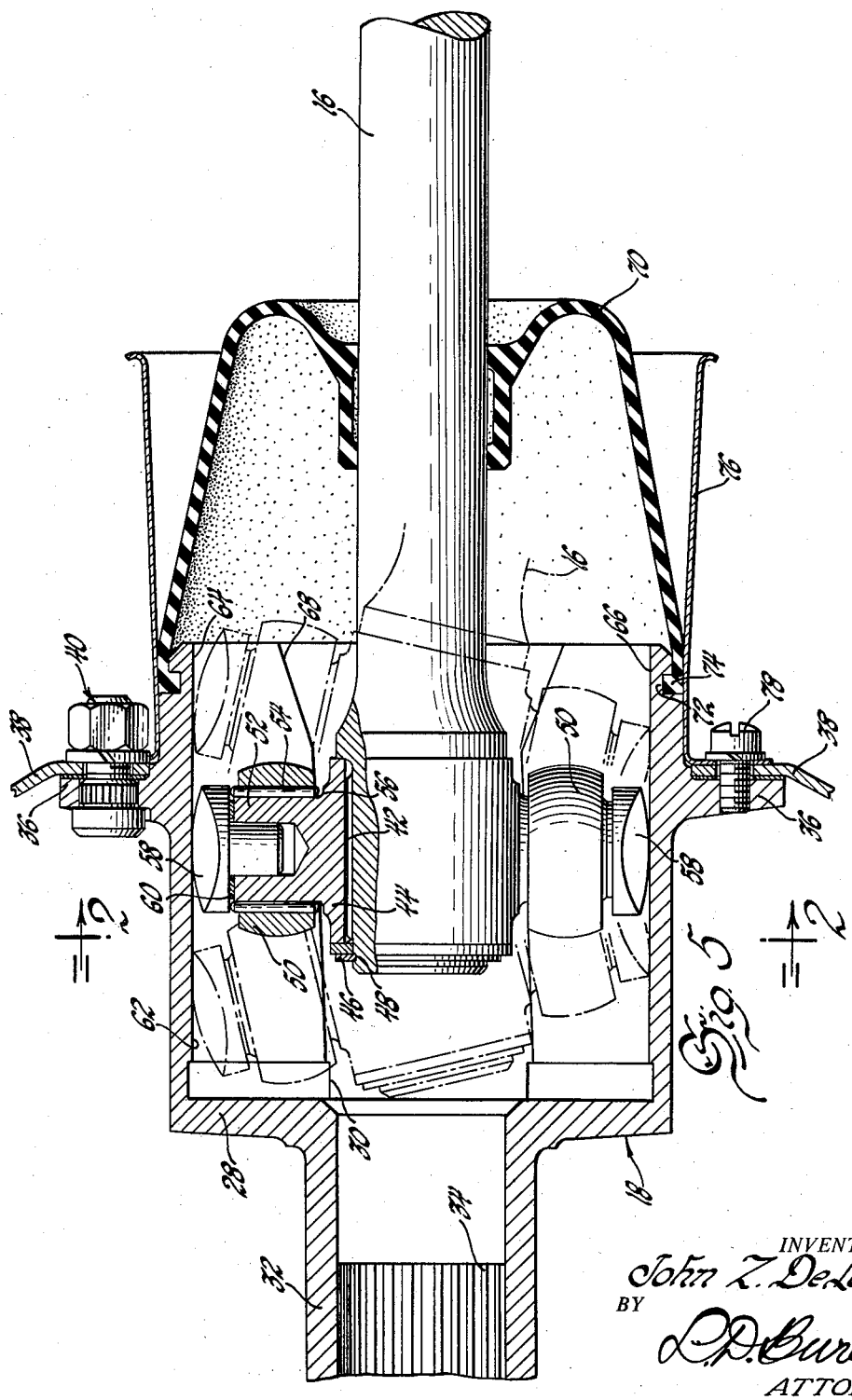

United States Patent Office 2,898,750
Patented Aug. 11, 1959

2,898,750

UNIVERSAL JOINT

John Z. De Lorean, Birmingham, Mich., assignor to General Motors Corporation, Detroit, Mich., a corporation of Delaware Application September 24, 1958, Serial No. 763,084

10 Claims. (Cl. 64—8)

This invention relates to universal joints and more particularly to a universal joint for use in a swing axle suspension wherein the axis of motion of each wheel is spaced from the center of articulation of the universal joint.

This invention is an improvement over the copending application Serial No. 706,192 entitled "Swing Axle Suspension for Vehicle Driving Wheels," and filed on December 30, 1957, under the same of John Z. De Lorean.

As used herein the term swing axle suspension refers to arrangements wherein the vehicle differential or axle drive is supported on the sprung mass and power is transmitted to the driving wheel by means of a swinging half-axle having a universal joint connection with the differential or axle drive. The deflection path of the wheel is essentially controlled by a generally laterally extending wheel supporting arm pivoted at its inboard end to the differential or sprung mass.

There are numerous modifications of swing axle suspensions, as defined herein, which are well known in the prior art. The present invention is particularly concerned with, and is herein applied to, a swing axle construction of the type wherein the pivot axis, or axes, of the wheel control arms are vertically spaced from the center of articulation of the universal joint connecting the live axle to the transmission, or differential unit. This suspension is familiarly referred to as a low pivot swing axle construction.

Independent rear wheel suspensions afford numerous advantages, such as substantially reduced unsprung weight, however, vehicles employing such suspensions display a marked tendency to squat during acceleration and to lift during braking, due to weight transfer. This problem is present in many suspensions but it has proven susceptible to geometric solution in most. However, in the case of swing axle suspensions, the solution has proved particularly elusive due to the fact that wheel deflection is confined to a single shaft axis of motion which affords an extremely limited latitude of geometric variation.

The device in which this invention is embodied comprises a universal joint between the vehicle differential unit and the live axle shaft portion carrying the driving wheel. The housing of the universal joint is provided with a shaft receiving opening, centrally and axially disposed therein, and a pair of bearing assembly receiving openings which are diagonally offset with respect to the shaft receiving opening. With a construction of this kind a swing axle construction is provided which substantially resists acceleration squat and brake lift. Such resistance is provided without affecting the suspension geometry and is accomplished by means of the live axle shaft tending to telescope into and out of the universal joint housing due to the action of the diagonally offset bearing assembly receiving openings. In other words, the driving torque tends to extend the length of the live axle while braking torque tends to reduce the length of the driving axle. The extension and reduction in length tend to induce inward or outward forces to substantially balance the downward or upward forces exerted on the suspension by the rear portion of the sprung mass under the influence of acceleration or braking.

It may thus be seen that acceleration squat and braking lift are substantially eliminated, resulting in a much more comfortable vehicle operation.

These and other advantages and features of the invention will become more fully apparent with reference to the accompanying specification and drawings wherein:

Figure 1 is a diagrammatic illustration showing the relationship of the suspension and drive parts.

Figure 2 is a sectional view of the universal joint taken along the line 2—2 of Figure 5.

Figure 3 is an end view of the universal joint housing of Figure 2.

Figure 4 is a plan view with parts broken away and in section of the housing shown in Figure 2 taken substantially along the line 4—4 of Figure 3 and looking in the direction of the arrows.

Figure 5 is a side view of the universal joint housing of Figure 2 with parts broken away and in section and taken substantially along the line 5—5 of Figure 2, to best show the location of the parts.

Referring more particularly to the drawings, the universal joint per se is best shown in Figures 2 through 5, and Figure 1 is a diagrammatic illustration of the suspension embodying the present invention. The sprung mass of the motor vehicle is illustrated generally by the numeral 10 and is shown to include a torque transmission unit, such as the differential 12. The driving wheel 14 is connected to the differential unit 12 by the half-axle shaft 16, the universal joint illustrated generally by the numeral 18, and the inboard brake unit 20. The wheel supporting arm 22 extends between the outboard end of the half-axle 16 and is pivoted to the differential unit as at 24. Relative axial movement between the supporting arm 22 and the half-axle 16 is prevented by the thrust bearing 26, which may be of any known construction. It is to be understood that the drive wheel suspension on the opposite side of the motor vehicle is of exactly the same configuration and contains the same parts as above described. The operation and features of the above identified suspension system will be later described.

The universal joint 18 which serves to connect the half-axle 16 to the sprung mass, is shown in sectional side view in Figure 5. The half-axle 16 extends into the universal joint housing 28 which has an opening 30 provided therein to receive the shaft. An extension 32 on the housing 28 has an inner spline 34 formed therein to receive the usual externally splined differential output shaft. A flange 36, extending radially outwardly from the housing 28 provides for connection between the brake drum 38 and the housing 28. A plurality of nut and bolt assemblies 40 are provided around the flange 38.

The half-axle shaft 16 is provided with an external spline 42 at the inward end which receives an internally splined trunnion member 44 carrying the bearing and bearing cap assembly. The trunnion is secured on the end of the axle shaft 16 by the retaining ring 46, fitting in an annular groove 48 in the end of the shaft 16.

The bearing sleeves 50 are placed about the extending shafts 52 of the trunnion 44 and are allowed relatively frictionless rotation thereabout by the annulus of needle bearings 54, retained on the trunnion by the shoulder 56 and the bearing cap 58. The bearing cap is outwardly biased from the end trunnion shaft 52 by a Belleville spring, or the like, 60 which maintains the bearing cap 58 in contact with the outer wall 62 of the bearing assembly receiving openings 64 and 66 in the housing 28.

It may be noted that the shaft receiving opening 30 is conically shaped at its outward end, as at 68, to allow angular movement of the half-axle shaft 16 with respect to the housing 28. This position is shown in Figure 5 in dashed and dotted lines.

In order to protect the universal joint housing from dirt and dust, a boot 70 is provided, the boot being secured in an annular groove 72 formed externally in the housing 28. The annular rib 74 of the boot is retained in the groove 72 by the sleeve 76. The sleeve is secured to the housing flange 36 and the brake drum 38 by a plurality of machine screws 78 placed around the circumference of the flange 36.

As best shown in Figures 2, 3 and 4, the bearing assembly receiving openings 64 and 66 are diagonally disposed with respect to the shaft receiving opening 30. It may be noted, particularly in Figure 4, that the shaft receiving opening centerline 80 is axially and centrally disposed through the housing 28. The centerline of the bearing assembly receiving opening 82 is shown in Figure 4 as being diagonally disposed with respect to the centerline 80. Similarly, the bearing assembly receiving opening centerline 84 is diagonally disposed with respect to the shaft receiving opening centerline 80. Referring to Figures 2 and 3 it may be seen that the horizontal planes containing the centerlines 80, 82 and 84 are spaced in parallel relation.

The bearing receiving openings 64 and 66 are theoretically best formed helically. However, it is not intended to limit the invention to the helical form. As a matter of practicality, the lead of the necessary helix is of such magnitude that the helix approaches a straight line and in deference to manufacturing procedures it is preferred that the openings be straight rather than helically formed.

In order that the purpose and mode of operation of the universal joint 18 may be fully understood, a description of the suspension and drive means under various vehicle operating conditions is as follows, reference being made particularly to Figure 1.

Inasmuch as the center of articulation of the universal joint 18 is spaced substantially vertically above and somewhat inboard of the axis of motion for the control arm 22, it is obvious that progressive wheel deflection from the design height position will require continuous change in the angular relation between the control arm 22 and its associated live axle 16. To accommodate this change, the thrust bearing 26 is provided to effectively prevent axial movement between the control arm 22 and the live axle 16. Since the bearing 26 prevents this axial movement, it is evident that normal wheel deflection would require limited increase and decrease in the effective overall length of the live axle 16 between the universal joint 18 and the bearing 27 due to the dissimilar arc of movement of arm 22 and axle 16. The relative movement referred to is accommodated by the helically or diagonally disposed bearing receiving openings 64 and 66 and the allowable movement of the live axle shaft 16 in the universal joint housing 28.

When the sprung mass 10 of the vehicle is subjected to increased vertical loading, in the absence of substantial torque on the universal housing 28 as for example, when the vehicle is at rest or when moving at a relatively uniform rate of speed, the entire sprung mass, including the differential unit and the inboard end of the control arm 22, is caused to move downwardly with respect to the ground. Since the wheel 14 is already on the ground, both the control arm 22 and the axle 16 are required to swing upwardly about the axis 24 and the center of the universal joint 18 respectively. The outer part of the axle 16 is prevented from moving axially with respect to the outer end of the control arm 22 and the angular movement just described causes inward telescoping movement of the trunnion and bearing assembly of the universal joint in the bearing receiving openings 64 and 66. However, as increased vertical loading on the sprung mass 10 occurs, as a result of weight transfer caused by vehicle acceleration, it follows that relatively high driving torque is being applied to the universal joint housing 28. Under these conditions driving torque on the housing acts through the helically or diagonally offset bearing receiving openings 64 and 66 and on the trunnion and bearing assembly to exert an outward component of thrust on the axle shaft 16. This component of force is transmitted through the thrust bearing 26 to offer resistance to upward swinging movement of the control arm 22 sufficient to counteract the increased vertical loading resulting from acceleration weight transfer.

Conversely, when the inboard brakes 20 are applied, while the vehicle is in motion, a retarding torque is applied to the housing 28 which reverses the direction of axial thrust developed by the trunnion and bearing assembly in the housing openings to exert a pulling action on the live shaft 16 tending to counteract the lifting of the sprung portion which normally accompanies deceleration weight transfer.

It may further be noted that the helical or diagonally disposed openings 64 and 66 in the universal joint housing 28 will allow normal rising and falling of the wheel to surmount road obstructions whenever the torque loading on the housing 28 is relatively low. Thus, whenever the vehicle is either at rest or progressing at a relatively constant speed, the housing openings and the trunnion and bearing assembly offer little or no resistance to axial telescoping and related wheel deflection.

While the preferred embodiment of the invention has been shown and described, it will be evident that other changes and further modifications may be made therein. It is therefore to be understood that it is not intended to limit the invention to the embodiment shown but only by the scope of the claims which follow.

I claim:

1. In a universal joint, a housing, first means centrally and axially formed in said housing for receiving a shaft, a shaft received in said first means, and second means in said housing spaced from said first means and diagonally disposed with respect thereto for receiving a bearing assembly mounted on said shaft and to impart a twisting movement to said shaft when said shaft is axially moved with respect to said housing.

2. The universal joint housing set forth in claim 1 wherein said second means is helically disposed longitudinally thereof.

3. In a universal joint, a housing having a shaft receiving opening axially and centrally disposed therein and a pair of bearing assembly openings on opposite sides of said shaft receiving opening, the centerlines of said bearing receiving openings being contained in spaced planes parallel to the transverse plane containing the centerline of said shaft receiving opening, the centerline of the first bearing assembly opening being diagonally disposed in one direction in said respective parallel plane with respect to the centerline of said shaft receiving opening, the centerline of the second of said bearing assembly receiving openings being diagonally disposed in the opposite direction in said respective parallel plane with respect to the centerline of said shaft receiving opening, and the orthographic projections of any two of said centerlines on the plane containing the third of said centerlines intersecting at a point substantially midway between the ends of said bearing receiving openings.

4. In a universal joint a housing having a shaft receiving opening axially and centrally disposed therein and a pair of bearing assembly openings on opposite sides of said shaft receiving opening, the centerlines of said bearing receiving openings being contained in spaced planes parallel to the transverse plane containing the centerline of said shaft receiving opening, the centerline of the first bearing assembly opening being diagonally disposed in one direction in said respective parallel plane with respect to the centerline of said shaft receiving opening, and the centerline of the second of said bearing assembly receiving openings being diagonally disposed in the opposite direction in said respective parallel plane with respect to the centerline of said shaft receiving opening.

5. The universal joint set forth in claim 4 wherein said bearing receiving opening centerlines are helically disposed in said parallel planes, the axes of said helices being diagonally disposed with respect to the centerline of said shaft receiving opening.

6. A universal joint comprising a housing having a shaft receiving opening axially and centrally disposed therein and a pair of bearing assembly openings on opposite sides of said shaft receiving opening, the centerlines of said bearing receiving openings being contained in spaced planes parallel to the transverse plane containing the centerline of said shaft receiving opening, the centerline of the first bearing assembly opening being diagonally disposed in one direction in said respective parallel plane with respect to the centerline of said shaft receiving opening, the centerline of the second of said bearing assembly receiving openings being diagonally disposed in the opposite direction in said respective parallel plane with respect to the centerline of said shaft receiving opening, and the orthographic projections of two of said centerlines on said plane containing the third of said centerlines intersecting at a point substantially midway between the ends of said bearing receiving openings, a shaft received in said housing and having a trunnion and bearing assembly mounted on the end thereof within said housing, said bearing assembly being slidably received in said bearing assembly openings for the transmission of torque from said housing to said shaft or from said shaft to said housing.

7. The universal joint described in claim 6 wherein said bearing receiving opening centerlines are helically disposed in said parallel planes, the axes of said helices being diagonally disposed with respect to the centerlines of said shaft receiving opening.

8. In a motor vehicle, a supported portion, a driving wheel secured on the outer end of a two-part half-axle, a universal joint connected to the inner part of said axle, means on said supported portion for applying driving and braking torque to said universal joint, a rigid arm having an outer hub portion rotatably supporting said wheel and the outer part of said two-part axle, means preventing relative axial movement between said arm and the outer part of said axle, the inner end of said arm being pivoted on said supported portion on an axis spaced from the center of articulation of said universal joint, said two-part half-axle having a trunnion and bearing assembly formed thereon, said universal joint including a housing having openings to receive said two-part half-axle and said trunnion and bearing assembly, said openings receiving said trunnion and bearing assembly being diagonally disposed with respect to said opening receiving said half-axle such that telescoping movement between said half-axle and said housing is permitted in absence of torque, while inward telescoping movement is resisted by acceleration torque and outward telescoping movement is resisted by retarding torque.

9. In a motor vehicle of the type described in claim 8 wherein said universal joint housing bearing assembly receiving openings are helically disposed with respect to said half-axle receiving opening.

10. In a motor vehicle a shaft, a trunnion and bearing assembly secured on the end of said shaft, a universal joint housing receiving said shaft and said trunnion and bearing assembly, means in said housing for receiving said trunnion and bearing assembly and permitting telescoping movement between said half-axle and said housing in absence of torque while inward telescoping movement is resisted by acceleration torque and outward telescoping movement is resisted by retarding torque.

References Cited in the file of this patent

UNITED STATES PATENTS

| | | |
|---|---|---|
| 1,027,644 | Diemer | May 28, 1912 |
| 1,284,471 | Schmid | Nov. 12, 1918 |
| 2,857,975 | Thorne | Oct. 28, 1958 |